United States Patent

Ringdahl et al.

[11] Patent Number: 5,958,486
[45] Date of Patent: Sep. 28, 1999

[54] FOOD PACKAGING AND METHOD FOR TREATING THE SAME

[75] Inventors: Ulf Ringdahl, Malmö; Majlis Pärsson, Svalöv, both of Sweden

[73] Assignee: Tetra LAval Holdings & Finance S.A., Pully, Switzerland

[21] Appl. No.: 08/981,389

[22] PCT Filed: May 29, 1996

[86] PCT No.: PCT/SE96/00689

§ 371 Date: May 1, 1998

§ 102(e) Date: May 1, 1998

[87] PCT Pub. No.: WO97/02181

PCT Pub. Date: Jan. 23, 1997

[30] Foreign Application Priority Data

Jul. 3, 1995 [SE] Sweden .................................. 9502391

[51] Int. Cl.⁶ .................................................. B65B 55/00
[52] U.S. Cl. ...................... 426/126; 426/127; 426/398; 426/399; 426/404; 426/407
[58] Field of Search ........................ 426/126, 127, 426/398, 399, 404, 407

[56] References Cited

U.S. PATENT DOCUMENTS

| | | | |
|---|---|---|---|
| 3,949,114 | 4/1976 | Viola et al. | 428/337 |
| 4,291,085 | 9/1981 | Ito et al. | 428/215 |
| 4,308,084 | 12/1981 | Ohtusuki et al. | 156/233 |
| 4,310,578 | 1/1982 | Katsura et al. | 428/35 |
| 4,559,266 | 12/1985 | Misasa et al. | 428/341 |
| 4,667,454 | 5/1987 | McHenry et al. | 53/425 |
| 4,702,963 | 10/1987 | Phillips et al. | 428/426 |
| 4,986,995 | 1/1991 | Kobayashi et al. | 426/412 |
| 5,455,089 | 10/1995 | Mochida et al. | 428/35.8 |

*Primary Examiner*—Nina Bhat
*Attorney, Agent, or Firm*—James Ray & Associates

[57] ABSTRACT

A method for heat preservation of a container filled with material is accomplished by means of heating and a pressure which is maintained during the holding time of the preservation process. The container of a material of laminate type is, after the holding time of the heat preservation, subjected to a supporting pressure during the cooling time of the process. A container intended to contain goods for heat preservation by means of heating and pressure comprises a base layer (1), an inner layer (3), and a barrier layer (4) between the base layer and the inner layer, and at least one layer consists of a plastic with memory.

11 Claims, 1 Drawing Sheet

FOOD PACKAGING AND METHOD FOR TREATING THE SAME

The present invention relates to a method for treating a container for foods as well as to the container itself. More specifically the invention relates to a method for heat preservation of a container filled with a material, the heat preservation being accomplished by means of heating and a pressure which is maintained during the holding time of the preservation process.

Completed containers for consumers or for individual portions of the non-disposable type have existed for a long time within the packaging technology. After their first use these containers are intended to be returned and prepared for a new use. Foods are nowadays often filled and transported in containers of a through-away type, i.e. containers intended to be used only once and then discarded or recycled.

The demand on a container intended for foods is—whether it shall be used once or several times—that it should be easy to manufacture and handle as well as be designed and constructed in such a way that it gives the best protection possible to the product which is to be filled and transported in the container. A good product protection implies among other things that the container should be sufficiently mechanically strong and dimensionally stable in order to withstand the outer influences which it is exposed to during normal handling without being deformed or destroyed. Furthermore, the container should be sufficiently physically and chemically impermeable in order to prevent a transport of liquid and/or gases through the walls of the container.

Furthermore, it is often required that the container is constructed in such a way that it allows aseptic filling of a product which is sterilized and filled under sterile conditions in a likewise sterilized container which after filling is sealed in such a way that while stored before being consumed the filled product is not reinfected by harmful micro-organisms. In other cases it is required that the foodstuff should be heat preserved in its container.

Concerning heat preserved products, these have for a long time been packed in jars, and the most common raw material is sheet iron or tin-plate. Autoclavable jars are also manufactured from steel and aluminium. The raw material for jars is thus expensive and the manufacturing costs are large.

Glass containers have also been used for all kinds of foods for a long time. However, the problem with glass containers is that they are very sensitive to blows and impacts and therefore require special care in order not to be destroyed while handled. If they are shattered they can furthermore cause injuries during a subsequent handling and consumption. Moreover, glass containers are usually manufactured cylindrically and can for that reason not be effectively stored.

Nowadays, bottles and jars of other materials also exist. Rigid plastic containers can be manufactured rather inexpensively and with a simple technique. Plastic is stronger than glass and more corrosion resistant than metals. Furthermore, it is lighter than both glass and metal.

There is thus a need for an inexpensive sterile stacking container which can be sterilized.

The known laminated through-away containers often consist of several material layers which together endow the container its desired properties. In this connection a laminate means a material which is constructed of more than two layers joined together. By combining materials with different properties the laminate can obtain such a state which would not be achieved with one material only.

Thus, a known package material consists of a base layer of paper or cardboard, which gives the container mechanical strength and dimensional stability, and of outer layers of polyethylene which make the container liquid impermeable. In order to supplement the container with impermeability properties against for example gases and other substances the package material is provided with at least one additional layer of a material with desired properties, e.g. aluminium or a barrier polymer. A package material of the laminated type described becomes more complicated in its construction the higher and more well-balanced the demands on the completed container are for the purpose of achieving optimal protection of the product to be filled. However, known containers of a packaging laminate with a liquid absorbing fibre layer cannot be used for heat treatment with moist heat without the desired mechanical rigidity of the packaging laminate and thus the dimensional stability of the container being impaired or lost.

Autoclaving of closed containers with a filling material has not previously been performed, the containers being manufactured from a laminate containing cardboard or paper.

In a simultaneously filed patent application a container is described which is manufactured from a laminated material, the container being intended for heat treatment with moist heat.

When a closed non-flexible container is heated with its goods the pressure within the container will rise since the contents of the container and its gases will expand and since the vapour pressure of water will increase. This increase of pressure is partly compensated for by the expansion of the container itself. However, the container will explode during the heat treatment if it is completely filled up. In order to avoid this the containers are only filled to about 95% of the volume of the container, an extra space (which is called head-space) being formed over the goods. The water vapour pressure in the container is predetermined for the heat treatment temperature contemplated. On the other hand, the partial pressures of the other gases can be reduced by the removal of air from the goods before filling as well as from the extra space before sealing the container.

The purpose of the invention is thus to provide a method for heat preserving, preferably by means of moist heat, a container filled with goods which is manufactured from a packaging laminate without the above mentioned drawbacks.

The invention also relates to a container being intended for containing a filling material which is to be heat preserved.

BRIEF DESCRIPTION OF THE DRAWINGS

In order to explain the invention in more detail reference is made to the accompanying drawing in which FIG. 1 schematically shows a cross section through a packaging laminate according to the invention in the form of a sheet or a web.

When exercising the method according to the invention a packaging laminate shown in FIG. 1 can be used. Like conventional packaging laminates the laminate comprises a relatively thick strengthening base layer 1 and an inner coating 3. Preferably, the packaging laminate also includes an outer coating 2.

Figure 1:
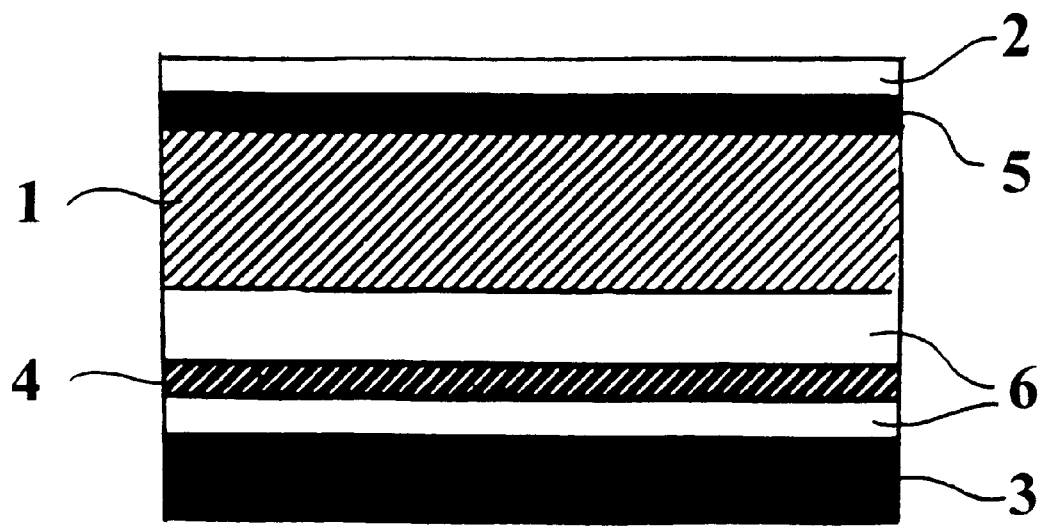

By the addition of additional layers to the laminate containers intended for individual products can be tailored.

In order to achieve an optimal protection for the product to be filled in the container a package material of the laminated type described will from reasons easily realized be complicated in its construction and composition and thus be more complicated the higher and more subtle the demands are on the completed container. After folding containers according to the invention have plane surfaces and a geometric configuration suitable for the purpose, which usually is parallelepipedic.

Of importance for the invention is that the container to be preserved includes a laminate containing a plastic with memory. In this connection a plastic with memory means a polymer material which is deformed at a suitable temperature and when chilled retains its deformed shape.

Such a plastic with memory is preferably included in one of the layers in the packaging laminate according to FIG. 1, but it can also be included in the other layers which are indicated below.

According to the invention polyolefins, polyesters, polyamids, polyvinyl alcohols, polycarbonates or acrylic polymers can be used as a plastic with memory.

Examples of usable polyolefins are low density polyethylene, medium density polyethylene, high density polyethylene, metalized high density polyethylene, polypropylene, oriented polypropylene, metalized (usually with aluminium) oriented polypropylene, a polypropylene copolymer and ethylene/vinyl alcohol, i.e. a copolymer of ethylene and vinyl alcohol (EVOH).

Examples of usable polyesters are polyethylene naphtalate, polybutene terephtalate, polyester, oriented polyester, metalized (usually with aluminium) oriented polyester and amorphous polyester, the polyester for example being polyethylene terephtalate.

Examples of usable polyamides are PA 6, PA 66 and Nylon MXD6.

An example of a usable acrylic polymer is polyacrylonitrile.

The heat treatment can be accomplished by means of dry air, water or steam as heat transfer medium. Preferably, a heat treatment is used with moist heat at a pressure above the atmospheric in autoclaves which are filled with water or steam. In this way the treatment can take place at such a high temperature as more than 100° C. In connection with a heat treatment in an autoclave the process can be divided into a rise time, a holding time and a cooling time. The rise time is the time from the beginning of the heating until the desired temperature has been obtained. At a pressure above the atmospheric of 0.5 bar the steam has a temperature of about 110° C. and at a pressure above the atmospheric of 1.1 bar the temperature is about 121° C. After the holding time, the time at which the desired temperature is kept constant, the pressure above the atmospheric in the autoclave is lowered to the normal atmospheric pressure, and during the cooling time the temperature is lowered by means of cooling of the autoclave.

When a closed container manufactured from a packaging laminate according to the invention is autoclaved a slight deformation of the laminate will be achieved during the holding time, which deformation results in that plane surfaces of the container will obtain a more or less substantial concavity. This concavity of the container can be varied and retained by applying a supporting pressure on the container during the cooling time of the preservation process, the plastic with memory in any of the laminates being locked in the form obtained during the heat treatment. In this connection a supporting pressure means a pressure within the autoclaving vessel, which during the cooling time is of the magnitude of up to 1 bar more than that in the closed container with filling material. The supporting pressure is maintained until the plastic with memory has set, which usually takes place at about 100° C.

The container can thus be filled at room temperature or lower and can obtain a concave surface without having a negative pressure after the preservation procedure.

An additional advantage of a container according to the invention, the plane surfaces of which having obtained a slight deformation after preservation, is that such a container easily can be fitted into an existing control system.

Cans according to the state of the art are often filled with its contents at 60° C., after which they are closed and heat preserved. After a cooling to room temperature the lid forms a concavity which indicates that a negative pressure still exists in the can. During microbial spoilage processes the can is expanded (a so called bombage) and this results in that the lid first becomes straight and then bulgingly curved. These changed forms of the lid can be measured and the results of the measurements can be used for shelf life control. Thus, containers according to the invention with their concave surfaces could easily be integrated in a control system of the can industry.

With reference to FIG. 1 the base layer 1 in a container according to the invention preferably consists of a material which can be cardboard, paper, polypropylene, foamed polypropylene, filled polypropylene (e.g. with chalk), polyester, amorphous polyester, filled polyester or filled amorphous polyester, the polyester for example being polyethylene terephtalate.

Furthermore, the cut edges on the packaging laminate in the completed container should be protected according to a simultaneously filed patent application.

In order to withstand the harsh environment of autoclaving the coatings 2 and 3 are according to the invention designed to be heat resistant and to have good vapour barriers. Thus, the outer coating 2 consists of a polymer which can be polypropylene, oriented polypropylene, metalized (usually with aluminium) oriented polypropylene, high density polyethylene, metalized high density polyethylene, linear low density polyethylene, polyester, metalized (usually with aluminium) oriented polyester or amorphous polyester, the polyester for example being polyethylene terephtalate. The outer coating 2 is not necessary when the base layer consists of another material than paper and cardboard. The inner coating 3 consists of a polymer which can be polypropylene, high density polyethylene, linear low density polyethylene, polyester or amorphous polyester, the polyester for example being polyethylene terephtalate.

Preferably, the packaging laminate according to the invention also has a barrier layer 4 arranged between the base layer 1 and the inner coating 3, which barrier layer 4 is intended to be facing the filling material of the packaging container. The barrier layer can consist of aluminium, a silica coating, ethylene/vinyl alcohol, polyvinyl alcohol, metalized (usually with aluminium) oriented polypropylene, an aluminium oxide coating or metalized (usually with aluminium) oriented polyester, the polyester for example being polyethylene terephtalate.

Furthermore, the packaging laminate according to the invention can have a layer 5 arranged between the base layer and the outer coating 2, which layer 5 can consist of polypropylene, low density polyethylene, medium density polyethylene, high density polyethylene or amorphous polyester, the polyester for example being polyethylene terephtalate. An additional similar layer can be arranged on the other side of the base layer 1.

Finally, the packaging laminate according to the invention can have a coating 6 adjacent one or both sides of the barrier layer 4, which coating 6 can consist of an adhesive plastic, a heat sealable plastic, e.g. polyethylene, a primer or a lacquer. An additional layer can be incorporated between the base layer 1 and the adjacent coating 6, which layer then preferably consists of one of the above mentioned components for the layer 5.

We claim:

1. A method for heat preserving a laminated container filled with foodstuff comprising heating said filled container constructed of a laminated material comprising at least one plastic layer with memory selected from the group consisting of polyolefins, polyesters, polyamids, polyvinyl alcohols, polycarbonates, and acrylic polymers under pressure wherein said layer becomes deformed and locked in form and retaining the resulting deformed shape during cooling of the preservation process by applying a supporting pressure during said cooling.

2. A method as claimed in claim 1, wherein the supporting pressure during the cooling is of the magnitude 1 bar.

3. A method as claimed in claim 1, wherein the heat preservation is accomplished by means of heating with dry air, water or steam as a heat transfer medium.

4. The method of heat preserving a laminated container filled with foodstuff of claim 1, wherein said laminated container comprises at least a base layer (1), an inner layer (3) and a barrier layer (4) disposed between the base layer and the inner layer.

5. A method of heat preserving a laminated container filled with foodstuff as claimed in claim 4, wherein the laminate material additionally includes an outer layer (2).

6. A method of heat preserving a laminated container filled with foodstuff as claimed in claim 4, wherein the memory plastic *which is locked in the form obtained during the heat treatment is included in the base layer (1).

7. A method of heat preserving a laminated container filled with foodstuff as claimed in claim 4 wherein said inner layer (3) includes the memory plastic which becomes deformed and locked in form during heat preservation.

8. A method of heat preserving a laminated container filled with foodstuff as claimed in claim 4 wherein said barrier layer (4) includes the memory plastic which becomes deformed and locked in form during heat preservation.

9. A method of heat preserving a laminated container filled with foodstuff as claimed in claim 5, wherein said outer layer (2) includes the memory plastic which becomes deformed and locked in form during heat preservation.

10. A method of heat preserving a laminated container filled with foodstuff as claimed in claim 4 wherein said base layer (1) consists of a material selected from the group consisting of paper, cardboard, polypropylene, foamed polypropylene, filled polypropylene, polyethylene terephthalate, filled polyethylene terephthalate, amorphous polyethylene terephthalate and filled amorphous polyethylene terephthalate, the inner layer (3) of said laminate material consists of a polymer selected from the group consisting of polypropylene, high density polyethylene, linear low density polyethylene, polyethylene terephthalate and amorphous polyethylene terephthalate, and that said barrier layer (4) of said laminate material is selected from the group consisting of aluminum, an aluminum oxide coating, a silica coating, ethylene/vinyl alcohol, polyvinyl alcohol, metalized polyethylene terephthalate and a metalized oriented polypropylene.

11. A method of heat preserving a laminated container filled with foodstuff as claimed in claim 5 wherein said outer layer (2) of said laminate material consists of a polymer selected from the group consisting of polypropylene, orient polypropylene, metalized oriented polypropylene, high density polyethylene, metalized high density polyethylene, linear low density polyethylene, polyethylene terephthalate, metalized polyethylene terephthalate and amorphous polyethylene terephthalate.

\* \* \* \* \*